United States Patent Office 2,926,994
Patented Mar. 1, 1960

2,926,994

PROCESS FOR PRODUCING POTASSIUM META-ANTIMONATE

Anthony Giordano, Cleveland, Ohio, assignor to The Harshaw Chemical Company, Cleveland, Ohio, a corporation of Ohio No Drawing. Application December 2, 1955
Serial No. 550,760

5 Claims. (Cl. 23—53)

This invention relates to a wet method for producing potassium meta-antimonate and to a new copper antimony compound derived therefrom. More particularly the invention relates to a novel improvement in the manufacture of potassium meta-antimonate according to wet methods and to the production of copper antimonate therefrom.

Potassium meta-antimonate allegedly has been produced heretofore by fusion methods wherein a melt of antimony or a compound of antimony such as antimony trioxide or trisulfide is produced by heating with large quantities of potassium nitrate at a dull red heat. The resulting product is washed to remove the excess potassium and nitrous or nitrate products and thereafter the washed product is boiled with water for long periods of time to obtain a so-called gummy soluble potassium meta-antimonate. This production method is unsatisfactory because of the long periods of heating involved and the impure nature of the resulting antimonate. Utilization of the potassium antimonate formed according to this dry method in the production of copper antimonate by the precipitation thereof with copper sulfate apparently results in a hydrated product having 5 molecules of water associated therewith.

Still another method for producing potassium meta-antimonate ($KSbO_3$) involves a wet treatment of antimony trioxide with a solution of potassium hydroxide to first form potassium antimonite. This is followed by the oxidation of the potassium antimonite with such oxidizing agents as potassium permanganate ($KMnO_4$), potassium dichromate ($K_2Cr_2O_7$) or hydrogen peroxide. In this particular method the antimony trioxide is first dissolved in the potassium hydroxide by long and continuous boiling to form potassium antimonite. It appears that those in the prior art have been laboring under the concept that complete solubility of the antimony trioxide in potassium hydroxide solutions to form the antimonite is necessary to obtain the desired result by oxidation treatments. Thus the prior art teaches the utilization of a solution of antimony trioxide in aqueous potassium hydroxide solutions. To the best of my knowledge, this particular wet method has not been used commercially and, in fact, it is doubtful whether the method would ever be used commercially in view of the extremely long periods of time required to dissolve the antimony trioxide in the potassium hydroxide solution.

It is an object of the herein described invention to provide a commercially practical process for producing potassium meta-antimonate and/or copper antimonate. It is a further object to provide a new process for producing potassium meta-antimonate and/or copper antimonate as well as a new hydrated compound of copper antimonate.

The process of the herein described invention may be considered an improved wet method for the production of potassium meta-antimonate. It has been discovered that potassium meta-antimonate may be produced by mixing potassium hydroxide aqueous solution, antimony trioxide solid and an oxidizing agent under conditions wherein the antimony trioxide is substantially undissolved in the potassium hydroxide solution. In effect it has been discovered that complete dissolution of the antimony trioxide in the potassium hydroxide solutions is unnecessary during the oxidation step. Accordingly, the long periods required heretofore for antimony trioxide dissolution to form potassium antimonite can be avoided. Basically, the process is one wherein the oxidation is carried out with a slurry of antimony trioxide in an aqueous potassium hydroxide solution. As a separate phase of the herein described invention it has been ascertained that the potassium antimonate thus produced may be utilized in the production of copper antimonate but that the resulting hydrated product upon drying is one which contains approximately 3 molecules of water associated therewith as opposed to the 5 molecules of water disclosed in the art. This particular hydrated product is especially effective when utilized in flameproofing and mildewproofing compositions for cellulosic materials. Thus a new composition of matter has been discovered which results from the particular method applicant has developed for producing the potassium antimonate utilizable in the ultimate production of copper antimonate.

The process for producing potassium antimonate according to the invention follows substantially quantitatively the following basic reaction

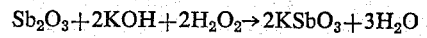
$$Sb_2O_3 + 2KOH + 2H_2O_2 \rightarrow 2KSbO_3 + 3H_2O$$

The general procedure to be employed in making the potassium antimonate according to the invention is one wherein antimony trioxide is slurried in a potassium hydroxide solution followed by the addition of the oxidizing agent, preferably hydrogen peroxide, to convert the constituents to potassium meta-antimonate. The addition of the oxidizing agent is made prior to substantial dissolution of the antimony trioxide.

Although the concentration of the potassium hydroxide dissolved in the aqueous solution is not critical from the standpoint of causing the reaction to proceed, from an economic standpoint it is most desirable to employ as highly a concentrated solution of potassium hydroxide initially as is possible to produce a mobile slurry of antimony trioxide. In general, concentrations in excess of 175 grams per liter KOH may be employed successfully with concentrations in excess of about 500 grams per liter being definitely preferred. The highly concentrated nature of the potassium hydroxide solution is furthermore extremely helpful in observing the endpoint resulting from the addition of the hydrogen peroxide or other oxidizing agent to the antimony trioxide slurry in batch type production operations.

Similarly, the amounts of potassium hydroxide utilized for slurrying a given amount of antimony trioxide are not critical from the point of view of causing the reaction to proceed. Theoretically the antimony trioxide should be slurried in the potassium hydroxide solution in amounts equivalent to 1 mol of $Sb_2O_3$ per 2 mols of KOH. When a mol ratio of $KOH/Sb_2O_3$ less than 2 is employed, the potassium antimonate solution ultimately resulting will be clouded by the presence of unreacted antimony trioxide and antimony trioxide regenerated from hydrolysis reactions. Accordingly, it is preferable to use in excess of 2 mols of potassium hydroxide per mol of antimony trioxide in order to obtain a complete reaction and a stable product and in this regard a mol ratio of $KOH/Sb_2O_3$ of from about 2.05 to 2.25, most specifically about 2.1 has been found preferable and most practical. It is not necessary that excessive amounts of potassium hydroxide be avoided although it is less desirable from an economic standpoint and from the standpoint of having the final product contaminated with excess potassium hydroxide. For example, excellent results have been attained when a mol ratio of $KOH/Sb_2O_3$ as high as 4 has been employed. Greater proportional quantities of KOH may be employed with equal facility as far as causing the reaction to proceed is concerned.

With regard to the antimony trioxide, it has been found highly desirable in acquiring a slurry thereof in potassium hydroxide that it be finely divided generally to less than about 5 microns and preferably less than 2 microns. Best results have been obtained when pigment grade antimony trioxide of a particle size less than 2 microns is employed in the slurry for the reaction. A coarser grade of antimony trioxide may be employed for purposes of the reaction although the speed of the reaction is materially increased by utilization of finer grades thereof.

It is highly desirable that the antimony trioxide be free of antimony tetra- and penta-oxides since these compounds are readily oxidized to form difficultly soluble potassium antimony complexes. These complexes are hard concretions which adhere rigidly to the sides of the vessels employed for carrying out the reaction and which furthermore tend to seed the formation of additional complexes from the more soluble potassium meta-antimonate when excessive oxidation conditions are present. Close control of the oxidation reaction will however permit utilization of a grade of antimony trioxide having substantial quantities of the tetra- and penta-oxides. Thus if localized zones of high concentrations of oxidizing agent are avoided, such that the tetra- and penta-oxides are not further oxidized to the insoluble complex forms, the impure grades (that is, antimony trioxide containing substantial quantities of the tetra- and penta-oxides) of antimony trioxides may be employed. However, as a practical matter in most large scale commercial operations, extreme control for the avoidance of this result is not feasible. Accordingly, it is generally preferred that the grade of antimony trioxide be chosen such that it does not contain more than about 1% by weight of the tetra- and penta-oxides therewith. Some complex forms of the overly oxidized potassium antimony compounds may be redissolved by heating in contact with the solution in the absence of further oxidation conditions but some others have been found impossible to redissolve. Again, however, it is emphasized that antimony trioxide material contaminated with the tetra- and penta-oxides may be employed where over-oxidation is especially avoided and/or where losses through the formation of the complexes are not considered excessively uneconomical.

In general, any suitable oxidation agent may be employed in the reaction so long as an insoluble salt of the oxidation compound is formed and/or contamination of the potassium meta-antimonate solution is not critical for the ultimate usage thereof. For example, potassium permanganate, potassium dichromate, oxygen, air, and hydrogen peroxide may be employed to accomplish oxidation. It has been found that hydrogen peroxide is most desirable because of its almost quantitative reaction capacity and the fact that neither contamination of the products or the removal of a by-product precipitate is necessary.

As mentioned above, the preferred amount of hydrogen peroxide or other oxidizing agent employed should be such as not to be in quantitative excess with respect to the quantity of potassium meta-antimonate to be produced thereby. Otherwise when an excess is employed the insoluble potassium antimony complexes are formed. Preferred amounts of hydrogen peroxide fall from about 1.50 to 2.0 mols of $H_2O_2$ per mol of $Sb_2O_3$ entering into the reaction. Since the reaction is almost quantitative, amounts of hydrogen peroxide amounting to close to 2 mols should be employed while avoiding excessive addition thereof. Excess addition of oxidants is contemplated as within the scope of the invention but is undesirable because of the complex potassium antimony compounds produced thereby.

It is to be understood that the invention is not to be limited only to the use of hydrogen peroxide for oxidation purposes although this particular oxidizing compound has been found most beneficial. Thus potassium permanganate, potassium dichromate, potassium ferricyanide $[K_3Fe(CH)_6]$ as well as chlorine have been found suitable. Similarly bromine, fluorine and oxygen may be employed.

The general procedure for carrying out the reaction on a batch scale contemplates slurrying antimony trioxide in a highly concentrated potassium hydroxide solution as a first step. In this regard a $KOH/Sb_2O_3$ ratio between about 2.05 and 2.25 is preferred. The antimony trioxide generally should be less than about 5 microns and preferably of pigment grade and should be gradually added to the concentrated potassium hydroxide solution with continued stirring so as to permit wetting of the particles thereof and to avoid the formation of lumps therein. Hydrogen peroxide is then slowly added to the potassium hydroxide containing antimony trioxide slurry in amounts ranging from about 1.50 to 2.0 mols thereof per mol of $Sb_2O_3$. In general a dilute solution of hydrogen peroxide is preferred in order to more easily control the oxidation conditions at the point of insertion. Thus by utilizing a diluted hydrogen peroxide solution it is easier to prevent over-oxidation in a localized area so that the insoluble potassium antimony complexes are avoided. The degree of dilution is not critical but as a practical expedient, a concentration of $H_2O_2$ of from about 50 to 100 g./l. has been successfully employed. Furthermore, the dilution of the hydrogen peroxide aids in protecting the solution against extreme rises in temperature since the reaction is highly exothermic in nature. Continuous stirring of the slurry is a practical expedient for avoiding localized over-oxidation. It is advisable to keep the temperature during the greater portion of the reaction below 70° C. to prevent effervescence due to the breakdown of hydrogen peroxide under higher temperature conditions. Depending on the circumstances under which the reactions are carried out, cooling may be necessary to accomplish the desired result and to prevent an undue rise in temperature. Temperatures for the reaction between about 45° C. and 80° C. are preferred in commercial operations although lower or higher temperatures may be utilized successfully for causing the reaction to proceed.

When the reaction is carried out on a batch basis, it will be noted that the slurry is highly viscous due to the high concentration of the potassium hydroxide and the high solids content thereof. The stirring is accomplished only with considerable resistance thereto. As the hydrogen peroxide solution is added and oxidation takes place, there is a point where a notable decrease in viscosity results. At this point it is advisable to quit adding the hydrogen peroxide as this is one means for indicating the endpoint of the reaction. At this point the temperature may be permitted to rise without the further addition of hydrogen peroxide so that the remainder of the antimony trioxide will be oxidized to potassium antimonate by the hydrogen peroxide already present in the reaction mixture.

The potassium antimonate produced according to the preferred method of operation of the process is a solution which is most advantageously employed in the production of high purity copper antimonate although it may be also be employed to form other metal antimonates. In this regard the copper antimonate is produced by reacting about 1 mol of copper sulfate therewith per 2 mols of $KSbO_3$. The copper antimonate $[Cu(SbO_3)_2]$ is precipitated and a potassium sulfate solution produced thereby. This reaction for the copper antimonate production may be carried out by adding a copper sulfate solution to the potassium antimonate solution under temperature conditions of from about 15° to 90° C. Operating temperatures other than these may be employed although the reaction is preferably carried out between about 30 and 65° C. In this regard it has been found that the copper antimonate precipitate becomes coarser with higher operating temperatures. In general, a slight excess of copper sulfate solution is preferred for a complete reaction and an amount equivalent to between 1.0 and about 1.1 mols of copper sulfate to 2 mols of potassium meta-antimonate is desirable. Thereafter the copper antimonate precipitate which is formed may be dried for example at 120° C. wherein a product results which is a copper antimonate having between about 2.7 and 3.4 mols of water associated therewith. Drying for the attainment of this compound should be conducted at temperatures between about 100° C. and 125° C. although drying may also be accomplished under a slight vacuum at lower temperatures.

Once the reaction is completed and formation of the soluble potassium antimonate has been accomplished the copper sulfate solution, most desirably having a concentration of copper sulfate between about 75 and 250 g./l., is added in amounts equivalent to about 1.05 mols of copper sulfate ($CuSO_4$) per 2 mols of $KSbO_3$ to precipitate the copper antimonate. The copper sulfate solution may be added with continued stirring of the solution and preferably accomplished at about 50° C. Thereafter the copper antimonate may be filtered, washed, and dried for example at about 120° C. The product formed upon drying at this temperature will be found to have the formula $Cu(SbO_3)_2 \cdot XH_2O$ wherein X is between 2.7 and 3.4 mols of water associated therewith. Calcination at about 400° C. will produce an anhydrous copper antimonate.

Specific examples of the herein described invention are as follows:

Example I

To produce potassium antimonate 437.3 grams of pigment grade antimony trioxide are added to a potasssium hydroxide solution formed by the addition of 201 grams of 85% KOH to 260 ml. of water. The antimony trioxide is added slowly with thorough mixing and stirring so as to accomplish wetting of all particles and to avoid lumpy formations. A dilute solution of hydrogen peroxide formed by the addition of 800 ml. of water to 300 ml. of 30.6% $H_2O_2$ is then added slowly to the slurry of antimony trioxide, 900 ml. thereof being added over a 60 minute period during which time the slurry is thoroughly agitated at a temperature of about 60° C. Cooling of the reaction vessel is employed so as to prevent a temperature rise that would cause breakdown of the hydrogen peroxide and effervescence of the reaction mix. The remaining amount of hydrogen peroxide solution is then added at the same rate as the initial amount, and the temperature permitted to rise to about 75–90° C. to accelerate the reaction to completion. The product resulting is a thin solution of potassium antimonate.

For the formation of copper antimonate 627 grams of potassium antimonate ($KSbO_3$), prepared as indicated above and contained in 1750 mls. of solution, are added simultaneously with 1750 mls. of a copper sulfate solution containing 100 grams of copper sulfate to 1000 ml. of water held at 65° C. The simultaneous addition of these two solutions is performed in about 20 minutes. The reaction mixture is continuously agitated during the strike and the pH at the endpoint is about 5.2. A precipitate of copper antimonate is thus formed which is then filtered off and washed free of potassium sulfate.

Example II

Another potassium meta-antimonate solution is prepared by first dissolving 385 grams of caustic potash flake (90.6% KOH) in 520 mls. of water. Then 874.5 grams of pigment grade antimony trioxide are added slowly and with continued stirring to form a lump-free, heavy, but mobile slurry.

A solution of hydrogen peroxide is prepared by mixing 510 mls. of 30.6% $H_2O_2$ (equivalent to 173.4 grams of 100% $H_2O_2$) with 1590 mls. of water at room temperature. The hydrogen peroxide solution is added slowly to the antimony trioxide slurry, 1700 mls. thereof being added over a period of 90 minutes, with constant agitation. The temperature during this period is maintained at between 60–65° C. by circulating cold water around the reaction vessel. The cooling is stopped at the end of 90 minutes and the remaining portion of hydrogen peroxide is added gradually while permitting the temperature to rise to between 75–90° C. so that oxidation of the remainder of the antimony trioxide will be accelerated. At the completion of the reaction the mixture changes from a fairly heavy slurry to a comparatively thin, slightly milky liquid. The resulting antimonate solution is then heated at 90–100° C. for about 30 minutes in order to expel any excess $H_2O_2$ remaining in the solution and to coagulate the insoluble antimonates such as sodium antimonate formed from impurities and peroxide stabilizers. The potassium meta-antimonate solution is finally filtered, or the clear solution decanted from the settled impurities.

To precipitate copper antimonate employing the potassium meta-antimonate solution resulting from the above preparation, 4700 grams of said potassium meta-antimonate solution (containing 14.62% or 687 grams of antimony metal) having a volume of 3630 mls. at 55° C. are taken. Separately, a solution of copper sulfate is made up by dissolving 740 grams of copper sulfate crystal ($CuO_4 \cdot 5H_2O$) in 2700 mls. of water at 60° C. after which the volume is adjusted to 3630 mls. at 55° C. with additional water.

The potassium metal-antimonate and copper sulfate solutions, both at 55° C. are run simultaneously over a period of 35 minutes into a vessel containing 2000 mls. of water also at 55° C. while maintaining constant agitation. At the end of the strike the mother liquor is checked to ascertain a slight excess of copper ion, and then about 12 liters of hot water are added with stirring to the contents of the precipitation vessel. After allowing the mixture to settle the supernatant liquid is drawn off. The precipitate is washed by decantation five more times with about 20 liters of hot water each time in order to remove all the potassium sulfate. After the final wash, the precipitate of copper antimonate is filtered and dried 24 hours at 120° C. It will be found that the resulting copper antimonate has associated therewith 3 mols of water per mol of copper antimonate.

Although the invention has been described herein with respect to batch type operations, it is apparent that adaptations of the process to continuous operations are contemplated as within the scope of the claims. The other oxidation agents may be employed in a similar manner as heretofore given in the examples appropriate steps being taken for the formation of by-products in applicable cases.

Having thus described the invention, what is claimed is:

1. The process for preparing a potassium meta-antimonate solution comprising adding an oxidizing agent to a slurry of solid state particulate antimony trioxide in an aqueous potassium hydroxide solution containing not less than 175 grams per liter of potassium hydroxide, said oxidizing agent being maintained in said solution during the dissolving of said antimony trioxide.

2. A process according to claim 1 wherein said antimony trioxide has a particle size less than about five microns and where said oxidizing agent is hydrogen peroxide.

3. The process for preparing a potassium meta-antimonate solution comprising mixing solid state particulate antimony trioxide having a particle size less than about two microns and a solution of potassium hydroxide having a concentration in excess of about 500 grams KOH per liter to form a slurry of antimony trioxide therein, said antimony trioxide being added in amounts equivalent to a KOH/$Sb_2O_3$ mole ratio of about 2.05:2.25 and adding to and maintaining in said slurry hydrogen peroxide in concentration equivalent to about from about 1.5 to about 2 moles of $H_2O_2$ per mole of $Sb_2O_3$, while said slurry is maintained in a temperature range from 15° C. to 90° C.

4. The process for preparing a potassium meta-antimonate solution comprising mixing solid state particulate antimony trioxide having a particle size less than about five microns and an aqueous solution of potassium hydroxide having a concentration in excess of about 175 grams KOH per liter to form a slurry of antimony trioxide therein and adding to and maintaining in said slurry a controlled amount of hydrogen peroxide whereby potasssium meta-antimonate is formed without the production of substantial quantities of insoluble potassium antimony complexes.

5. A process according to claim 4 wherein said hydrogen peroxide is added in amounts up to mole ratio of $H_2O_2/Sb_2O_3$ of about 2.

References Cited in the file of this patent

UNITED STATES PATENTS

| | | |
|---|---|---|
| 1,888,713 | Britton et al. | Nov. 22, 1932 |
| 1,916,797 | Horner | July 4, 1933 |

OTHER REFERENCES

Mellor: "A Comprehensive Treatise on Inorganic and Theoretical Chemistry," vol. 9 (1929), pages 447–448; page 459.

Gmelin-Kraut's "Handbuch der Anorganischen Chemie," Band 5, A.B.T. 1, page 1249.

Hoffmann: "Lexikon der Anorgan. Verbindungen," Band 1, 2 Halfte, 1919, page 1211.